United States Patent [19]

Breant

[11] Patent Number: 5,166,250
[45] Date of Patent: Nov. 24, 1992

[54] FLAME-RETARDANT ETHYLENE POLYMER COMPOSITIONS AND PROTECTIVE SHEATHING OF ELECTRICAL CABLES THEREWITH

[75] Inventor: Patrice Breant, Robecq, France

[73] Assignee: Atochem, Puteaux, France

[21] Appl. No.: 674,899

[22] Filed: Mar. 26, 1991

[30] Foreign Application Priority Data

Mar. 26, 1990 [FR] France ................................ 90 03804

[51] Int. Cl.[5] .......................... C08J 3/20; C08K 3/10; C08L 23/04
[52] U.S. Cl. .................................... 524/437; 524/436; 524/425
[58] Field of Search ........................ 524/436, 437, 425

[56] References Cited

U.S. PATENT DOCUMENTS 5,032,321 7/1991 Breant ................................ 428/364

Primary Examiner—Paul R. Michl
Assistant Examiner—U. K. Rajguru
Attorney, Agent, or Firm—Burns, Doane, Swecker & Mathis

[57] ABSTRACT

Flame-retardant polymer compositions, well adopted, e.g., for the protective sheathing of electrical cables, comprise (a) at least one ethylene/carboxylic acid unsaturated ester copolymer (A), (b) advantageously, at least one ethylene/alkyl (meth)acrylate/unsaturated dicarboxylic acid anhydride terpolymer (B), (c) at least one copolymer of ethylene and at least one α-olefin (C), (d) advantageously, at least one low-density polyethylene (D), (e) at least one plasticized polynorbornene polymer (E) having a rubbery glass transition temperature, and (f) a major amount of a hydrated inorganic filler material.

14 Claims, No Drawings

FLAME-RETARDANT ETHYLENE POLYMER COMPOSITIONS AND PROTECTIVE SHEATHING OF ELECTRICAL CABLES THEREWITH

BACKGROUND OF THE INVENTION

1. Field of the Invention

The present invention relates to novel flame-retardant compositions based on ethylene polymers and to the use of such novel compositions for the protective sheathing of electrical cables. More especially, the compositions of the invention are devoid of halogenated derivatives and can be converted by conventional techniques into shaped articles which have good fire resistance, notably protective insulating covering material for electrical cables.

2. Description of the Prior Art

Improving the fire resistance of compositions containing polymeric constituents is a perennial objective of the manufacturers and converters of such materials. The goal is to markedly reduce the flammability of such materials, as well as their ability to propagate flames. While the use of halogenated flame-retardant agents is well known to this art, this option presents the great disadvantage of resulting in the formation of toxic and corrosive gases upon the combustion or burning thereof. The manufacturers and converters have, therefore, focused on the development of compositions containing metal oxides, hydroxides or inorganic salts in lieu thereof, such as alumina and magnesia hydrates.

In particular, EP-A-326,775 describes flame-retardant polymeric compositions consisting essentially of 120 to 240 parts by weight of hydrated inorganic filler material per 100 parts by weight of the polymeric phase:

(a) 15 to 55 parts by weight of at least one ethylene/vinyl acetate copolymer (A) having a vinyl acetate content ranging from 20% to 50% by weight, (b) 25 to 62 parts by weight of at least one ethylene/alkyl (meth)acrylate/unsaturated dicarboxylic acid anhydride terpolymer (B), (c) 8 to 45 parts by weight of at least one copolymer of ethylene and at least one α-olefin (C) having a relative density ranging from 0.880 to 0.915 and a crystallinity of at least 5%, and (d) 0 to 5 parts by weight of at least one low-density polyethylene (D).

These prior art compositions comprising 150 parts by weight of alumina hydrate have a limiting oxygen index (determined according to ASTM standard D-2863) ranging from 35% to 37%, an elongation at break (determined according to ASTM standard D-638) ranging from 110% to 125%, and a tensile strength (determined according to ASTM standard D-638) ranging from 11 to 14 MPa. On the other hand, such compositions, which have good fire resistance properties, exhibit a lack of flexibility, reflected in a 1% secant modulus (determined according to NFT standard 54-102 (71)) of at least 200 MPa, which renders them unsuitable for such applications as the production of flexible shaped articles (sheets) and in particular for the sheathing of flexible cables.

Furthermore, GB-A-2,190,384 describes flame-retardant compositions comprising a filler (aluminum trihydrate, magnesium hydroxide) and a polymeric mixture containing (by weight) 10% to 80% of polyethylene or ethylene/vinyl acetate copolymer, 10% to 60% of ethylene/propylene elastomer and 10% to 40% by weight of an ethylene/(meth)acrylic acid copolymer, such compositions having a limiting oxygen index which does not exceed 31.

It is also known to this art, furthermore, that the physical, and especially the mechanical properties (elongation and tensile strength) of compositions of this type are greatly reduced when the filler content increases.

SUMMARY OF THE INVENTION

Accordingly, a major object of the present invention is the provision of novel flame-retardant compositions based on ethylene polymers which, while exhibiting mechanical properties which are comparable with those of EP-A-326,775 at the highest possible content of inorganic filler materials, have a flexibility such that, in particular, their 1% secant modulus (determined according to NFT standard 54-102 (71)) does not exceed 100 MPa.

Indeed, it has now surprisingly been found that the above objects can be attained by modifying the compositions of EP-A-326,775 to diminish the proportion of ethylene/alkyl (meth)acrylate/maleic anhydride terpolymer therein and by adding a plasticized polynorbornene thereto.

Briefly, the present invention features flame-retardant polymeric compositions comprising a hydrated inorganic filler material, at least one ethylene/carboxylic acid unsaturated ester copolymer and at least one copolymer of ethylene and of at least one α-olefin, said compositions including 120 to 240 parts by weight of hydrated inorganic filler per 100 parts by weight of the polymeric phase:

(a) 20 to 70 parts by weight, approximately, of at least one ethylene/carboxylic acid unsaturated ester copolymer (A) having a carboxylic acid unsaturated ester content ranging from 1% to 50 mol %;

(b) 0 to 5 parts by weight, approximately, of at least one ethylene/alkyl (meth)acrylate/unsaturated dicarboxylic acid anhydride terpolymer (B), (c) 15 to 60 parts by weight, approximately, of at least one copolymer of ethylene and of at least one α-olefin (C) which has a relative density ranging from 0.860 to 0.915 and a crystallinity of at least 1%, (d) 0 to 5 parts by weight, approximately, of at least one radical low-density polyethylene (D), and (e) 10 to 225 parts by weight, approximately, of at least one polynorbornene polymer (E) containing a amount of plasticizer which is sufficient to lower its glass transition temperature to the rubber range.

DETAILED DESCRIPTION OF THE PREFERRED EMBODIMENTS OF THE INVENTION

More particularly according to the present invention, exemplary hydrated inorganic fillers suitable for incorporation in the subject compositions include the hydroxides of aluminum $Al(OH)_3$ and of magnesium $Mg(OH)_2$, hydrated carbonates such as hydrated magnesium and calcium carbonate, for example having a mean particle size advantageously ranging from 0.5 to 2 μm.

The ethylene/carboxylic acid unsaturated ester copolymers (A) are typically prepared by copolymerization, at elevated pressure and at high temperature in the presence of free-radical initiators, of ethylene and of at least one ester of an unsaturated carboxylic acid such as acrylic acid or methacrylic acid, and of a saturated alcohol having from 1 to 18 carbon atoms, or else an ester of a saturated carboxylic acid and of an unsaturated alcohol. Exemplary process for the preparation of these copolymers is described in FR-A-2,569,411 and 2,569,412. Exemplary such esters include, for example, vinyl acetate and propionate, methyl and butyl methacrylates and methyl, ethyl, isopropyl, n-butyl, isobutyl, tert-butyl and 2-ethylhexyl acrylates. These copolymers advantageously contain from approximately 5% to 35 mol % of carboxylic acid unsaturated ester and have a melt index (measured according to ASTM standard D-1238) which preferably ranges from approximately 1 to 10 dg/min.

According to the present invention, by "ethylene/alkyl (meth)acrylate/unsaturated dicarboxylic acid anhydride terpolymer (B)" is preferably intended a polymer comprising:

(i) from 83% to 98.7 mol % of recurring structural units derived from ethylene, (ii) from 1% to 14 mol % of recurring structural units derived from at least one acrylic and/or methacrylic acid ester, and (iii) from 0.3% to 3 mol % of recurring structural units derived from an unsaturated dicarboxylic acid anhydride such as, for example, maleic anhydride.

The melt index of the terpolymer (B), measured under standard conditions (190° C., 2.16 kg load) of ASTM standard 1238, advantageously ranges from 1 to 10 dg/min.

This terpolymer can be prepared, for example, under the conditions described in FR-A-2,498,609, FR-A-2,569,411 and FR-A-2,569,412. The acrylic or methacrylic acid ester preferably includes an alkyl radical having from 1 to 8 carbon atoms. Exemplary such radicals include methyl, ethyl, n-propyl, isopropyl, n-butyl, isobutyl, n-pentyl, n-hexyl, 2-ethylhexyl, n-octyl and cyclohexyl acrylates and methacrylates.

The copolymer (C) of ethylene and of at least one α-olefin is prepared by copolymerization in the presence of catalyst systems of the Ziegler type. It generally has a standard melt index (as defined above) ranging from 1 to 5 dg/min. Exemplary copolymers (C) include the polyolefin rubbers marketed by Mitsui under the trademark Tafmer i.e., copolymers including 78% to 92 mol % of ethylene and 8% to 22 mol % of an α-olefin selected from among propylene and 1-butene, which have a relative density of 0.860 to 0.890, a residual crystallinity of 1% to 14%, a crystalline melting temperature J of 75° C., an average geometric molecular mass of 60 to 120 kg/mole and a polydispersity index ranging from 2.2 to 2.7. It is also possible to select a polyolefin rubber including an ethylene/propylene and/or 1-butene copolymer having a melt index ranging from approximately 0.3 to 15 dg/min and a relative density ranging from, approximately, 0.865 to 0.885, containing from 77% to 91 mol % of recurring structural units derived from ethylene and from 9% to 23 mol % of recurring structural units derived from propylene and/or 1-butene, such rubber having a crystalline melt temperature J ranging from approximately 100° to 125° C. Such a rubber can be additionally characterized by at least on of the following properties:

(1) a polydispersity index ranging from approximately 3.5 to 15, preferably from approximately 4 to 8, (2) an average geometric molecular mass (defined as indicated below) ranging from approximately 35 to 70 kg/mole, (3) a relationship between the relative density d and the concentration x (expressed in mol %) of recurring structural units derived from propylene and from 1-butene, which is expressed by the double equation:

$$0.9084 \leq d + 0.002x \leq 0.918,$$

(4) a residual crystallinity (determined according to the technique described below) ranging from approximately to 15%.

By "crystalline melting temperature J" is intended the temperature determined at the maximum of the melting curve after crystallization, obtained by subjecting the sample of copolymer to the following three-stage process:

(i) melting at the rate of 8° C. per minute from 10° C. to 150° C., then (ii) crystallization at the rate of 8° C. per minute from 150° C. to 10° C., then again (iii) melting at the rate of 8° C. per minute from 10° C. to 150° C.

The residual crystallinity according to the present invention is determined by X-ray diffraction on a sample of copolymer which has been subjected to cooling at the rate of 5° C. per hour from 190° C. to room temperature.

By "mean geometric molecular mass" is intended the mathematical relationship:

$$\log_{10} Mg = \sum_{i=1}^{i=N} W \log_{10} M_i$$

wherein $W_i$ is the weight fraction of substance of mass $M_i$ and N is the number of fractions eluted using gel permeation chromatography.

Such copolymers can be prepared, especially, by copolymerizing a gas stream comprising approximately 18% to 42% by volume of ethylene and from 58% to 82% by volume of olefins (propylene+1-butene) at a temperature ranging from approximately 160° to 270° C. and at a pressure ranging from approximately 400 to 850 bars, in the presence of a catalyst system of the Ziegler type, comprising an organoaluminum activator and a compound of a transition metal of Groups IVB, VB, VIB and VIII of the Periodic Table.

Finally, exemplary copolymers (C) include copolymers having a relative density ranging from 0.905 to 0.915 in accordance with EP-B-72,220 and copolymers having a relative density ranging from 0.890 to 0.905.

The low-density polyethylene (D) is prepared by homopolymerization of ethylene at elevated temperatures (typically 140° to 350° C.) and at a high pressure (typically 1,000 to 4,000 bars) in the presence of a free-radical initiator (such as oxygen, peroxides or peresters). Its relative density typically ranges from 0.915 to 0.935 and it has a standard melt index (as defined above) which advantageously ranges from 1 to 10 dg/min.

By "polynorbornene polymer (E)" is intended an amorphous polymer or copolymer of bicyclo[2.2.1]-2-heptene and substituted derivatives thereof, as described in U.S. Pat. No. 3,676,390. Among the plasticizers for polynorbornene which are capable of lowering its glass transition temperature to the rubber range, exemplary are the aromatic, naphthenic or paraffinic heavy oils derived from petroleum, having a solidification point below 0° C. and a flash point of above 180° C., and diesters of phthalic acid, such as dioctyl or didodecyl phthalates. These plasticizers can be employed alone or in admixture.

An amount of plasticizer which is sufficient to lower the glass transition temperature of the polynorbornene to the rubbery range typically ranges from approximately 50% to 150%, preferably 60% to 120%, by weight of the weight of the polynorbornene.

Particularly preferred are compositions according to the invention which contain, per 100 parts by weight of the polymeric phase:
(a) 35 to 62 parts by weight of copolymer (A),
(b) 0 to 3 parts by weight of terpolymer (B),
(c) 24 to 51 parts by weight of copolymer (C), and
(e) 12 to 15 parts by weight of plasticized polynorbornene (E).

Such compositions exhibit not only a 1% secant modulus not exceeding 100 MPa, but also a limiting oxygen index (determined according to ASTM standard D-2863) of at least 36, a perfect drip resistance (according to the sheet simulation test), an elongation at break of at least 110% and a tensile strength of at least 10 MPa. The 1% secant modulus of the compositions according to the invention decreases when the proportion of plasticized polynorbornene (E) increases and/or when the proportion of hydrated inorganic filler decreases.

The compositions according to the invention can be prepared by mixing the ingredients in the form of a powder or granules, such as to provide a homogeneous mixture which is ready to use.

They can also be prepared by mixing, followed by melting and granulating of the constituents of the polymeric phase. The granulates obtained are then mixed with the desired amount of flame-retardant agent to provide a homogeneous mixture which is also ready to use.

Lastly, the subject compositions may be formulated by admixing all of the constituents, those of the polymeric phase being in the molten state, followed by extrusion and granulation. The extrusion may also be carried out by means of a coextruder at a temperature which typically ranges from approximately 140° C. to 190° C.; the compositions in which the polymeric phase is in the molten state and the uniformly dispersed hydrated inorganic filler can then be directly converted, for example into a covering for a metal cable.

The present invention also features industrial products comprising the compositions described above. More particularly, such industrial products include sheathed electrical cables and flexible sheet materials.

Crosslinking of the compositions according to the invention is advantageously carried out, such as to avoid creep when hot, especially during the manufacture of electrical cable coverings. This crosslinking is carried out by adding a sufficient amount of crosslinking agent to prevent creep at the envisaged conversion temperature (for example, approximately 80° C. in the case of power cables). The crosslinker is especially selected from among the peroxides, ethylenically unsaturated silanes such as vinyltrimethoxysilane (in a first stage, the compound is grafted onto the polyethylene chain and in a second stage the crosslinking is carried out by reaction with water to form Si—O—Si bridges between two molecules), and epoxy derivatives which function by reaction with the anhydride functional groups of the terpolymer (B).

In addition to this application in cable manufacture, the compositions according to the invention find other applications where their fire resistance and their good mechanical properties are required. They present the advantage of convertibility into flexible industrial shaped articles (sheets, panels, sections, hollow bodies, tubes, pipes) exhibiting improved fire resistance, by conventional polyolefin conversion techniques (extrusion, injection molding, rotational molding).

In order to further illustrate the present invention and the advantages thereof, the following specific examples are given, it being understood that same are intended only as illustrate and in nowise limitative.

In said examples to follow, all of the compositions were prepared by providing a mixture of the various constituents in the form of powders or granules in an internal mixer, in which the polymeric constituents were melted and by then compounding the mixture for 5 minutes on a Lescuyer-type calender at a temperature of 140° C. All contained alumina hydrate Al(OH)$_3$ having a mean particle size of 0.5 μm.

Also in said examples, the following properties were measured on compositions pressed into plaques having a thickness of 4 mm in a 35-ton press at 180° C. for 10 minutes:
(a) the tensile strength (TS) determined according to ASTM standard D-638 and expressed in megapascals (MPa),
(b) the elongation at break (EB) determined according to ASTM standard D-638 and expressed in %,
(c) the limiting oxygen index (LOI) determined according to ASTM standard D-2863 and expressed in %, and
(d) the 1% secant modulus (SM) determined according to NFT standard 54-102 (71) and expressed in MPa.

EXAMPLES 1 to 5

Compositions were prepared by employing 0.675 part of antioxidant marketed under the trademark Santonox ®, 170 parts by weight of alumina hydrate and the following polymeric constituents:

(i) an ethylene/methyl acrylate copolymer (A) which had a methyl acrylate content of 30% by weight, a melt index (measured according to ASTM standard D-1238 at 190° C. under a 2.16 kg load) of 2 dg/min, marketed by Norsolor under the trademark Lotryl 3610;

(ii) an ethylene/n-butyl acrylate/maleic anhydride terpolymer (B) containing 97.8 mol % of units derived from ethylene, 1.2 mol % of units derived from n-butyl acrylate and 1 mol % of units derived from maleic anhydride, marketed by Norsolor under the trademark Lotader 3200;

(iii) an ethylene/1-butene copolymer (C) which had a relative density of 0.900, a melt index (measured according to ASTM standard D-1238 at 190° C. under a 2.16 kg load) of 1 dg/min, marketed by Norsolor under the trademark Norsoflex ® FW 1900;

(iv) a polynorbornene polymer (E) marketed by Norsolor under the trademark Norsorex ® and plasticized beforehand with 45% by weight of a naphthenic oil marketed by Texaco under the trademark Dealen RD 25.

The quantities, expressed in parts by weight, of the polymeric constituents employed to prepare the compositions and the results of measurements of the above properties of said compositions, are reported in the Table below:

TABLE:

| Example | (A) | (B) | (C) | (E) | TS | EB | LOI | SM |
|---------|-----|-----|-----|-----|----|----|-----|-----|
| 1 | 35 | 0 | 51 | 14 | 10 | 122 | 37.0 | 66 |

TABLE:-continued

| Example | (A) | (B) | (C) | (E) | TS | EB | LOI | SM |
|---|---|---|---|---|---|---|---|---|
| 2 | 62 | 0 | 24 | 14 | 10 | 133 | 37.0 | 64 |
| 3 | 52 | 2 | 34 | 12 | 10 | 123 | 37.2 | 70 |
| 4 | 62 | 0 | 15 | 23 | 10 | 120 | 36.0 | 60 |
| 5 | 20 | 5 | 60 | 15 | 10 | 120 | 36.0 | 65 |
| 6 | 62 | 0 | 24 | 14 | 10 | 112 | 36.8 | 68 |
| 7 | 45 | 30 | 25 | 0 | 11 | 123 | 37.0 | 200 |

EXAMPLE 6

The procedure of Example 2 was repeated, with the exception of the quantity of alumina hydrate, which was increased to 185 parts by weight. Results of measurements of the above properties of the resulting composition are reported in foregoing Table.

EXAMPLE 7 (Comparative)

The procedure of Examples 1 to 5 was repeated, except that the plasticized polynorbornene polymer (E) was omitted. Results of measurements of the above properties of the resulting composition are also reported in the foregoing Table.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A flame-retardant polymer composition of matter, comprising (i) at least one ethylene/carboxylic acid unsaturated ester copolymer (A), (ii) at least one copolymer of ethylene with at least one α-olefin (C), (iii) at least one polynorbornene polymer (E), and (iv) a hydrated inorganic filler material.

2. The flame-retardant polymer composition as defined by claim 1, comprising (a) from about 20 to 70 parts by weight of at least one ethylene/carboxylic acid unsaturated ester copolymer (A) having a carboxylic acid unsaturated ester content ranging from 1 to 50 mol %; (b) from about 0 to 5 parts by weight of at least one ethylene/alkyl (meth)acrylate/unsaturated dicarboxylic acid anhydride terpolymer (B); (c) from about 15 to 60 parts by weight of at least one copolymer of ethylene and at least one α-olefin (C) having a relative density ranging from 0.860 to 0.915 and a crystallinity of at least 1%; (d) from about 0 to 5 parts by weight of at least one radical low-density polyethylene (D); (e) from about 10 to 25 parts by weight of at least one plasticized polynorbornene polymer (E) having a rubbery glass transition temperature; and (f) a hydrated inorganic filler material.

3. The flame-retardant polymer composition as defined by claim 2, comprising from 120 to 240 parts by weight of said hydrated inorganic filler material (f) per 100 parts by weight of said polymer constituents (a), (b), (c), (d) and (e).

4. The flame-retardant polymer composition as defined by claim 3, comprising (a) from 35 to 62 parts by weight of copolymer (A), (b) from 0 to 3 parts by weight of terpolymer (B), from 24 to 51 parts by weight of copolymer (C), and (e) from 12 to 15 parts by weight of plasticized polynorbornene polymer (E).

5. The flame-retardant polymer composition as defined by claim 3, said polynorbornene polymer (E) comprising from 50% to 150% by weight of plasticizer therefor.

6. The flame-retardant polymer composition as defined by claim 3, said copolymer (A) comprising from about 5 to 35 mol % of recurring structural units derived from carboxylic acid unsaturated ester.

7. The flame-retardant polymer composition as defined by claim 3, said terpolymer (B) comprising from 83 to 98.7 mol % of recurring structural units derived from ethylene, from 1 to 14 mol % of recurring structural units derived from at least one acrylic and/or methacrylic acid ester, and from 0.3 to 3 mol % of recurring structural units derived from an unsaturated dicarboxylic acid anhydride.

8. The flame-retardant polymer composition as defined by claim 3, said terpolymer (B) having a standard melt index ranging from 1 to 10 dg/min.

9. The flame-retardant polymer composition as defined by claim 3, said copolymer (C) having a standard melt index ranging from 1 to 5 dg/min.

10. The flame-retardant polymer composition as defined by claim 1, further comprising a creep-preventing crosslinking amount of a crosslinking agent.

11. The flame-retardant polymer composition as defined by claim 3, further comprising a creep-preventing crosslinking amount of a crosslinking agent.

12. A shaped article comprising the flame-retardant polymer composition as defined by claim 1.

13. An electrical cable having a protective sheathing comprising the flame-retardant polymer composition as defined by claim 1.

14. The flame-retardant polymer composition as defined by claim 1, said hydrated inorganic filler material comprising a hydroxide of aluminum and/or magnesium or a carbonate of magnesium or calcium.

* * * * *